(12) United States Patent
Breau et al.

(10) Patent No.: US 8,630,283 B1
(45) Date of Patent: Jan. 14, 2014

(54) SYSTEM AND METHOD FOR APPLICATIONS BASED ON VOICE OVER INTERNET PROTOCOL (VOIP) COMMUNICATIONS

(75) Inventors: Jeremy R. Breau, Leawood, KS (US); Eric E. Miller, Olathe, KS (US); Sei Y. Ng, Overland Park, KS (US); Carl J. Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 865 days.

(21) Appl. No.: 12/718,420

(22) Filed: Mar. 5, 2010

(51) Int. Cl.
*H04L 12/66* (2006.01)

(52) U.S. Cl.
USPC .......... 370/352; 370/356; 370/329; 370/354; 370/355; 455/406; 455/408; 455/461; 455/435; 455/465

(58) Field of Classification Search
USPC ................................. 370/352–356
See application file for complete search history.

(56) References Cited

U.S. PATENT DOCUMENTS

| | | | |
|---|---|---|---|
| 8,185,105 B2 * | 5/2012 | Zhu et al. ........................ 455/433 |
| 8,270,954 B1 | 9/2012 | Breau et al. |
| 8,489,080 B1 | 7/2013 | Breau et al. |
| 2006/0140385 A1 * | 6/2006 | Haase et al. ............. 379/221.09 |
| 2006/0246874 A1 | 11/2006 | Sullivan |
| 2007/0032247 A1 | 2/2007 | Shaffer et al. |
| 2007/0100749 A1 | 5/2007 | Bachu et al. |
| 2008/0037727 A1 | 2/2008 | Sivertsen et al. |
| 2008/0248797 A1 | 10/2008 | Freeman et al. |
| 2008/0281665 A1 | 11/2008 | Opaluch |
| 2008/0305811 A1 * | 12/2008 | Cai et al. ........................ 455/461 |
| 2009/0215453 A1 * | 8/2009 | Blanco Blanco et al. .. 455/435.1 |
| 2009/0227236 A1 * | 9/2009 | Sanchez Herrero et al. ........................ 455/414.1 |
| 2009/0238174 A1 * | 9/2009 | Veenstra et al. ............... 370/352 |
| 2009/0319641 A1 * | 12/2009 | Verbandt et al. .............. 709/220 |
| 2010/0041369 A1 * | 2/2010 | Narayan et al. ............... 455/408 |
| 2010/0150140 A1 * | 6/2010 | Britsch ......................... 370/352 |
| 2010/0184403 A1 * | 7/2010 | Cai et al. ........................ 455/406 |
| 2010/0268826 A1 * | 10/2010 | Dahl et al. .................... 709/226 |
| 2010/0291972 A1 | 11/2010 | Gandhi et al. |
| 2011/0066731 A1 * | 3/2011 | Falken et al. ................. 709/226 |
| 2011/0265153 A1 * | 10/2011 | Guccione et al. ................ 726/5 |

OTHER PUBLICATIONS

Breau, Jeremy R., et al. Patent Application entitled "Concierge for Portable Electronic Device," filed Aug. 6, 2012, U.S. Appl. No. 13/568,004.

First Action Interview Pre-Communication dated Dec. 27, 2011, U.S. Appl. No. 12/698,513, filed Feb. 2, 2010.

(Continued)

*Primary Examiner* — Asad Nawaz
*Assistant Examiner* — Khaled Kassim

(57) ABSTRACT

A system is provided comprising an application server and a media proxy. The application server comprises a first processor, a first memory, and a first application stored in the first memory that, when executed by the first processor, transmits a first digital media stream for mixing with a first voice over internet protocol (VoIP) stream. The media proxy is stored in a second memory and, when executed by a second processor, receives the first voice over internet protocol stream, mixes the first digital media stream with the first voice over internet protocol stream to produce a second voice over internet protocol stream, transmits the second voice over internet protocol stream, receives a third voice over internet protocol stream, produces a fourth internet protocol stream based on the third internet protocol stream, and transmits the fourth internet protocol stream.

17 Claims, 10 Drawing Sheets

(56) References Cited

OTHER PUBLICATIONS

Final Office Action dated Mar. 9, 2012, U.S. Appl. No. 12/698,513, filed Feb. 2, 2010.

Notice of Allowance dated May 15, 2012, U.S. Appl. No. 12/698,513, filed Feb. 2, 2010.

First Action Interview Pre-Communication dated Sep. 7, 2012, U.S. Appl. No. 13/568,004, filed Aug. 6, 2012.

* cited by examiner

SYSTEM AND METHOD FOR APPLICATIONS BASED ON VOICE OVER INTERNET PROTOCOL (VOIP) COMMUNICATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Voice over Internet Protocol (VoIP) communication comprises encoding voice as digital data, encapsulating this digital data into data packets, and transporting these data packets over a data network. A voice over internet protocol phone (VoIP phones) promotes VoIP communication.

SUMMARY

In an embodiment, a system is disclosed. The system comprises an application server and a media proxy. The application server comprises a first processor, a first memory, and a first application stored in the first memory that, when executed by the first processor, transmits a first digital media stream for mixing with a first voice over internet protocol (VoIP) stream. The media proxy is stored in a second memory and, when executed by a second processor, receives the first voice over internet protocol stream, mixes the first digital media stream with the first voice over internet protocol stream to produce a second voice over internet protocol stream, transmits the second voice over internet protocol stream, receives a third voice over internet protocol stream, produces a fourth internet protocol stream based on the third internet protocol stream, and transmits the fourth internet protocol stream.

In an embodiment, a method is disclosed. The method comprises establishing a voice over internet protocol (VoIP) call from a first voice over internet protocol phone to a second voice over internet protocol phone and, after establishing the voice over internet protocol call, transmitting a pre-configured voice over internet protocol application trigger signal from the first voice over internet protocol phone. The method further comprises transmitting an audio content by a voice over internet protocol application in response to the first voice over internet protocol phone transmitting the trigger signal and mixing the audio content into a first voice over internet protocol stream transmitted to the first voice over internet protocol phone by a media proxy application.

In an embodiment, a method is disclosed. The method comprises transmitting a subscription information for a voice over internet protocol application service by a voice over internet protocol phone, the subscription information comprising an identification of a trigger to associate with the service and receiving the subscription information by an activation server. The method further comprises transmitting by the activation server at least some of the subscription information to a voice over internet protocol application server operable to provide the service. The method further comprises transmitting to a home subscription server (HSS) the trigger identification and a session initiation protocol (SIP) routing information by the application server, wherein the session initiation protocol routing information that the home subscription server can use to route a session initiation protocol message to the application server when the voice over internet protocol phone sends a session initiation protocol message containing the trigger to the home subscription server. The method promotes provisioning, at least in part, the voice over internet protocol application service.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
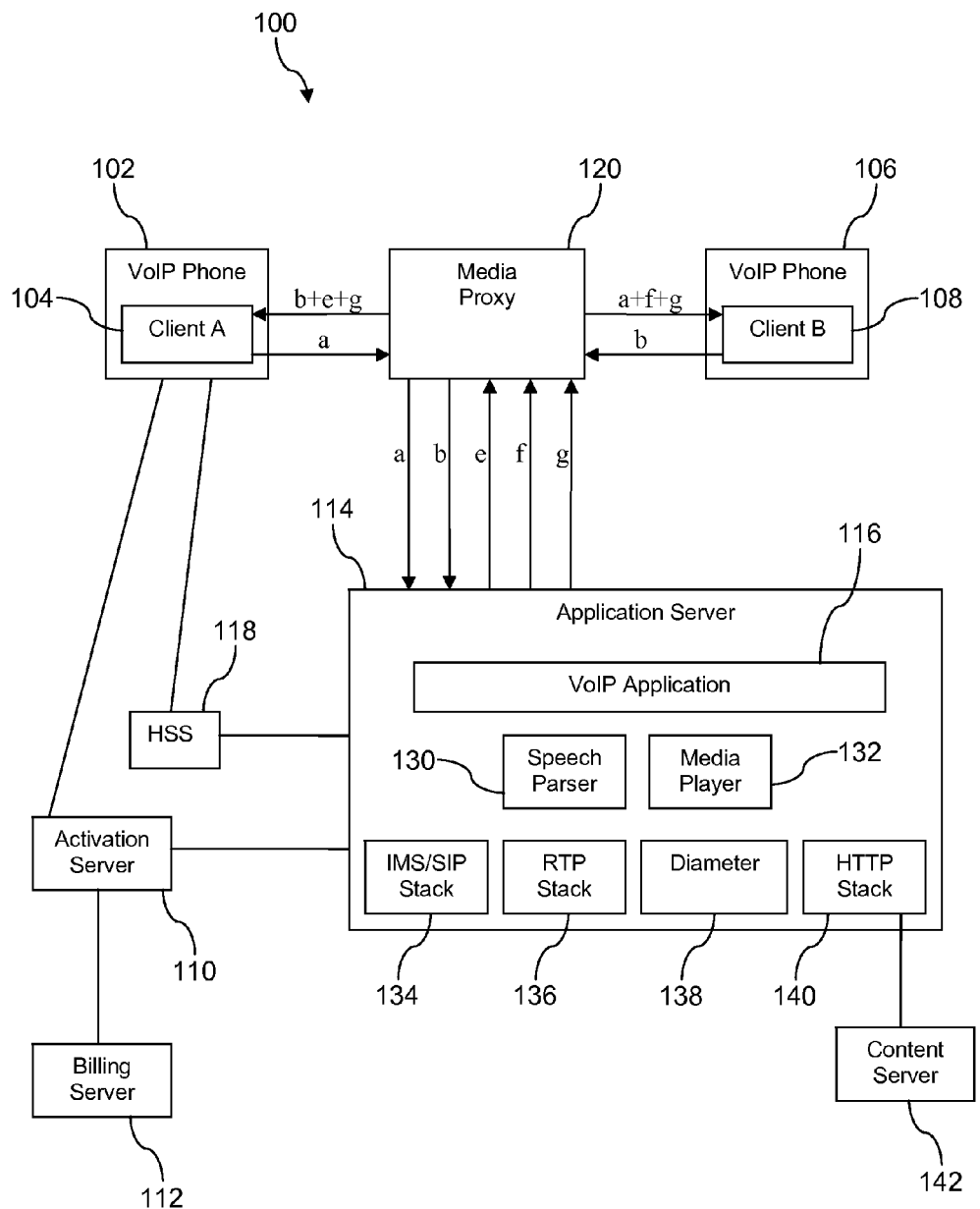
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system and methods for providing voice over internet protocol (VoIP) applications. VoIP applications may provide optional or supplemental services to standard VoIP communications, for example to a VoIP call between two parties. For example, in an embodiment, when a user of a first VoIP phone is engaged in a conversation with a user of a second VoIP phone, the user of the first VoIP phone may trigger activation of a background mood music VoIP application that inserts a selected audio into the VoIP stream transported to the first VoIP phone and into the VoIP stream transported to the second VoIP phone, so that both users may hear a pleasant and soothing music theme as a non-disruptive background to their conversation. In some contexts, a VoIP application may be referred to as a VoIPLet.

The present disclosure teaches a method for subscribing to and/or provisioning a VoIP application service. The user of a VoIP phone sends a subscription message to an activation server identifying the desired subscription VoIP application service and a desired trigger signal that the VoIP phone will send to invoke the VoIP application service. The activation server sends information about the desired trigger signal and an identity of the first VoIP phone to a VoIP application server that provides the subject VoIP application service. The VoIP application server sends information to a home subscription server (HSS) identifying the trigger signal, defining how to route a session initiation protocol (SIP) message to the VoIP application server to invoke the VoIP application service, and optional other information related to traffic flow templates maintained by the home subscription server. Before sending the information to the VoIP application server, the activation server optionally may first work with a billing server associated with an account of a user of the first VoIP phone to arrange payment for the VoIP application service. The VoIP application service may be provisioned for one time use or for a pre-defined number of uses. The VoIP application service may be subscribed on a pre-paid basis, where the VoIP application service is provided until an account balance is exhausted. Alternatively, the VoIP application service may be subscribed on a post-paid basis, where fees for VoIP application service are accumulated and periodically billed to an account of the user of the first VoIP phone. Other subscription payment arrangements may also be used.

The present disclosure teaches several alternative architectures for delivering VoIP application service. In an embodiment, a media proxy is introduced between the first VoIP phone and the second VoIP phone through which the VoIP stream from the first VoIP phone passes during transport to the second VoIP phone and through which the VoIP stream from the second VoIP phone passes during transport to the first VoIP phone. The media proxy provides one or more sets of auxiliary ports at locations and/or addresses that may be inferred from the base port locations and/or addresses of the fundamental VoIP phone call. One or more VoIP application servers may deliver VoIP application service through the sets of auxiliary ports. For example, a VoIP application server may insert an audio for one-way insertion into the VoIP stream directed to the first VoIP phone or may insert an audio for two-way insertion into both the VoIP stream directed to the first VoIP phone and the VoIP stream directed to the second VoIP phone. The media proxy may combine or mix the audio from the VoIP application so that this audio is overlaid or superpositioned with the subject VoIP stream and/or VoIP steams. In an alternative embodiment, the described functions of the media proxy may be distributed out to one or more of the VoIP phones and the VoIP application server. For example, the combining, mixing, and/or superpositioning of audio from the VoIP application server and the VoIP stream may be performed within the first VoIP phone, within the second VoIP phone, and/or within the VoIP application server.

Turning now to FIG. 1, a communication system 100 for providing VoIP application services to VoIP calls is described. In an embodiment, the system 100 comprises a first VoIP phone 102 having a first VoIP client 104 and a second VoIP phone 106 having a second VoIP client 108. During some operation modes of the system 100, the first VoIP phone 102 and the second VoIP phone 106 may be connected in a VoIP call. The first VoIP phone 102 may produce a first VoIP stream directed to the second VoIP phone 106 represented by the arrow designated by the letter 'a.' The second VoIP phone 106 may produce a second VoIP stream directed to the first VoIP phone 102 represented by the arrow designated by the letter 'b.' Alternatively, the first VoIP phone 102 may be engaged in a VoIP call with another non-VoIP phone via a media access gateway that mediates between the non-VoIP phone, for example a plain-old-telephone-service (POTS) phone, and the VoIP communication protocols. In an embodiment, the system 100 may further comprise an activation server 110, a billing server 112, an application server 114 executing a VoIP application 116, a home subscription server 118, and a media proxy 120. In some embodiments, however, the system 100 may have additional, different, or fewer elements. For example, in an embodiment, the system 100 may not comprise the media proxy 120, and the functions that would have been provided by the media proxy 120 may be distributed to other parts of the system 100, for example to one or more of the VoIP phones 102, 106 and/or the application server 114.

The activation server 110, the billing server 112, the application server 114, and the home subscription server 118 may be implemented as computer systems. Computer systems are discussed in more detail hereinafter. In an embodiment, the media proxy 120 may be deployed as an application executing on a server that is a computer system. The first VoIP phone 102 and/or the second VoIP phone 106 may be implemented as portable electronic devices, for example a mobile phone, a personal digital assistant, a media player, or other electronic device. An exemplary portable electronic device is discussed in more detail herein after. Alternatively, the first VoIP phone 102 and/or second VoIP phone 106 may be implemented as a device sharing much of the structure of a computer system.

While the system 100 is illustrated with a limited number of components, it is understood that the system 100 may comprise many more components. For example, it is understood that the system 100 promotes any number of VoIP phones 102, 106 engaging in VoIP communication. As the application server 114 begins to be heavily loaded by numbers of subscribers using the VoIP application service provided by the VoIP application 116, additional servers having the same structure of the application server 114 may be stood up and brought into service. In general, the architecture of system 100 is readily scalable to any number of VoIP application subscribers by standing up and bringing into service additional activation servers 110, additional application servers 114, additional home subscription servers 118, and additional media proxies 120 as needed.

Figure 2:
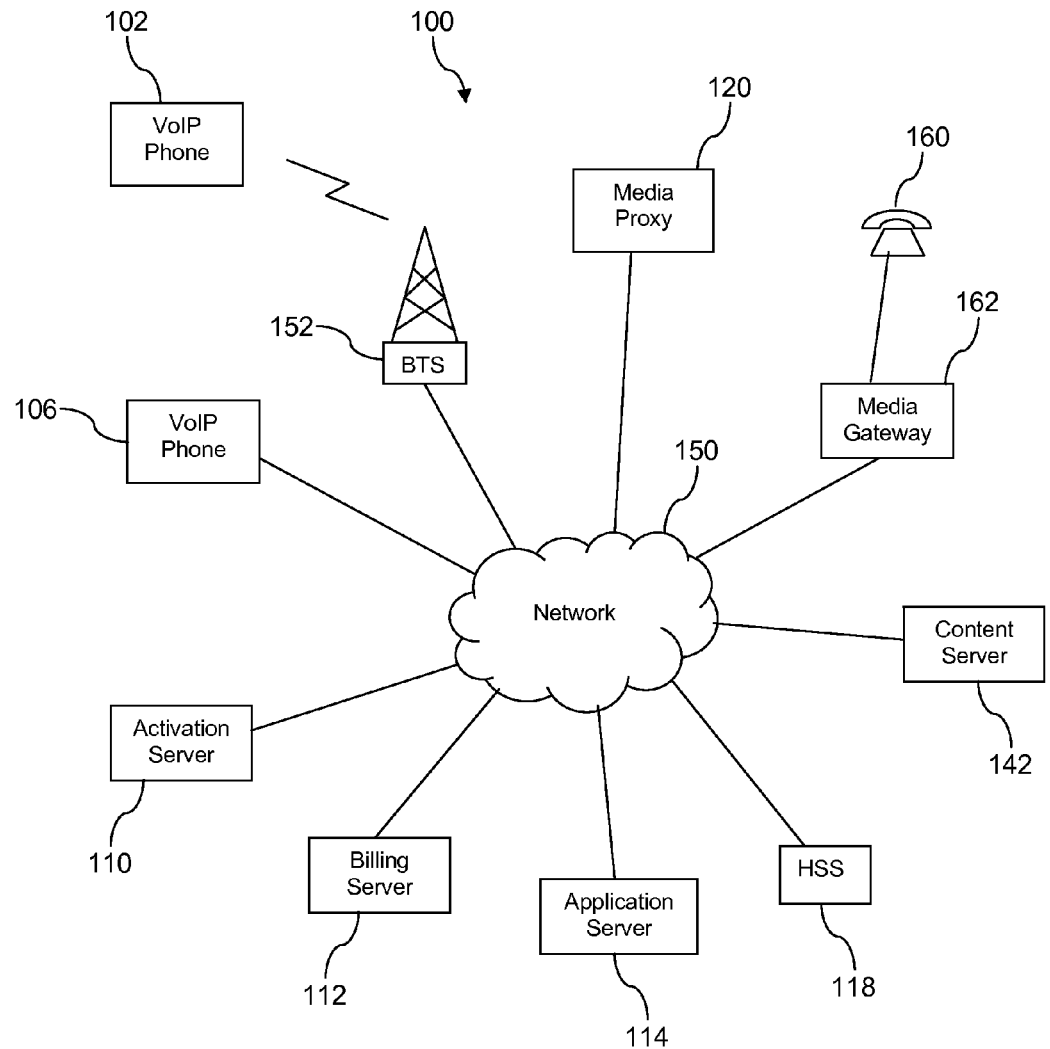
FIG. 2 is an illustration of the communication system according to an embodiment of the disclosure.

While the components of the system 100 are illustrated in FIG. 1 as directly coupled to each other, it is understood that many, if not all, of the communication links are provided by indirect coupling through a network. Turning now to FIG. 2, the system 100 is illustrated with system components communicating via a network 150. The network 150 may comprise public networks, private networks, and a combination thereof. At least a portion of the network 150 may comprise a mobile communication network. At least a portion of the network 150 may comprise the Internet and/or an internet protocol multimedia system (IMS) core network. The first VoIP phone 102 may communicate with the network 150 via a base transceiver station 152, wherein the base transceiver station 152 provides a wireless communication link to the first VoIP phone 102. Alternatively, the first VoIP phone 102 may receive a wireless communication link from a femto cell or from a wireless access node to access the network 150. The second VoIP phone 106 may be coupled to the network 150 by a network connection, for example a data connection. A plain-old-telephone-service (POTS) phone 160 may receive VoIP service via a media gateway 162 that mediates between the POTS interface of the POTS phone 160 and the VoIP communication protocols. The various components of the system 100 communicate with each other via the network 150.

The network 150 may comprise a large number of devices providing the functionality of the network 150 such as switching devices, routers, IMS function platforms, and others. While some components of the system 100 are illustrated in FIG. 2 as outside and coupled to the network 150, what nodes and/or components of system 100 are deemed to be inside versus outside the network 150 is largely an arbitrary decision based on what one may be attempting to describe. In the present disclosure, the home subscription server 118, for example, might well have been abstracted as within the cloud representing the network 150, but it helps to clarify the architecture and operating principles of the system 100 to illustrate and describe it separately from the network 150.

Returning now to FIG. 1, the illustrated communication links may comprise any of a variety of different communication links including session initiation protocol (SIP) communication links, real time protocol (RTP) communication links, signaling links, VoIP links, and other kinds of communication links. At least some of the communication links may be provided in part over wireless communication links, as described above with reference to FIG. 2.

In an embodiment, the application server 114 may provide a VoIP application service associated with the VoIP application 116. For example, the VoIP application server 114 may provide a concierge service to one or both of the VoIP phones 102, 106 based on executing a concierge application—the VoIP application 116. For more details about the concierge service, see U.S. patent application Ser. No. 12/698,513 filed Feb. 2, 2010, entitled "Concierge for Portable Electronic Device" by Jeremy R. Breau et al., which is hereby incorporated herein by reference for all purposes. It is contemplated that the application server 114, the provisioning methods, the communication methods, and the architecture of the system 100 taught by the present disclosure may support a wide variety of different VoIP applications. In some contexts, a VoIP application may be referred to as a VoIPLet. The application server 114 and the VoIP application 116 are able to provide the subject VoIP application service to a plurality of users concurrently, not just the VoIP phones 102, 106. For example, the application server 114 may be able to provide the VoIP application service associated with the VoIP application 116 to 5 concurrent VoIP calls, 50 concurrent VoIP calls, 500 concurrent VoIP calls, or some other number of concurrent VoIP calls. The VoIP application 116, for example, may instantiate a separate thread or process to provide the subject VoIP application service to each of the concurrent VoIP calls.

A brief summary of a few contemplated VoIP application services are discussed further below, but it is understood that a wide variety of VoIP application services are expected to be suitable for service delivery using the system 100 and related methods. In an embodiment, two or more different VoIP applications 116 may execute on the one VoIP Server 114. Alternatively, different VoIP applications 116 may be deployed on different VoIP Servers 114.

The application server 114 may further comprise a speech parser 130 and a media player 132. The speech parser 130 may analyze speech to identify commands, to translate speech to text, to translate text to speech, to identify contextual queues present in a conversation between the user of the VoIP phones 102, 106, and other like actions. The media player 132 may play snippets of audio for insertion into one or more VoIP streams and/or transcode audio content from a first format to a second format.

In an embodiment, the application server 114 may comprise an IMS/SIP stack 134, a RTP stack 136, a diameter interface 138, and an HTTP stack 140. The internet protocol multimedia system (IMS)/session initiation protocol (SIP) stack 134 promotes the application server 114 communicating with an IMS core network and conducting session initiation protocol communications. The real time protocol (RTP) stack 136 promotes the application server 114 receiving and/or transmitting real time protocol messages. The diameter interface 138 promotes the application server 114 accessing various communication authentication and authorization services, for example from a diameter server (not shown). The hypertext transport protocol (HTTP) stack promotes the application server 114 communicating using hyper text transport protocol with other devices, for example with a content server 142. The content server may be implemented as a computer system.

Figure 3:
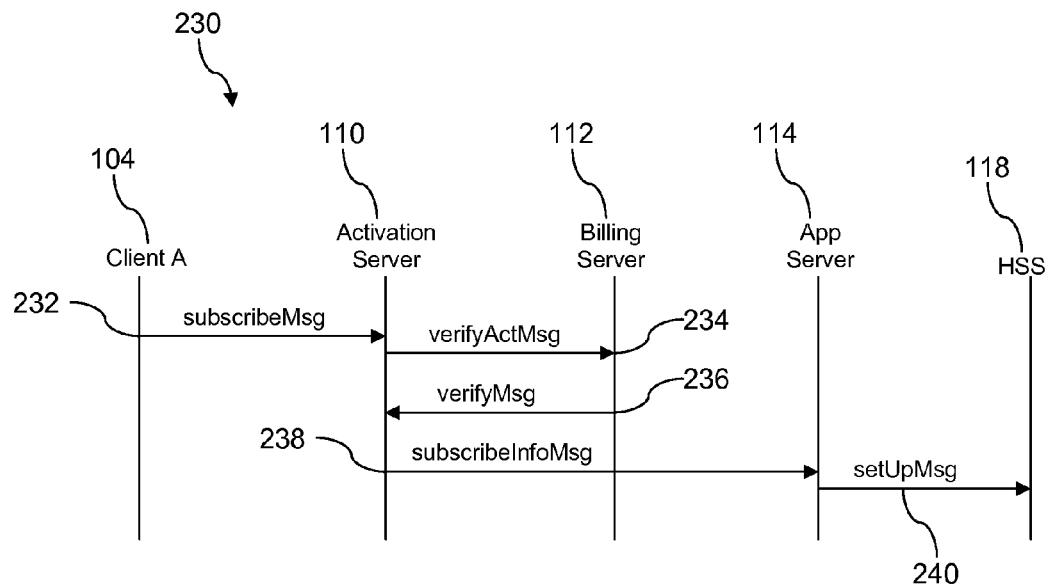
FIG. 3 is a message sequence diagram of a provisioning method according to an embodiment of the disclosure.

Turning now to FIG. 3, a message sequence 230 for provisioning a VoIP application service for invocation by the first VoIP phone 102 is described. The message sequence 230 may be used by the first VoIP phone 102 and/or the first VoIP client 104 to subscribe to receive a particular VoIP application service. The first VoIP client 104 may send a message 232 to the activation server 110 to subscribe to or otherwise obtain the VoIP application service provided by the VoIP application 116. The message may be contained in a session initiation protocol (SIP) message or in another kind of message format. The message, which may be referred to as a subscription message, contains information identifying the VoIP application service and a trigger signal that the first VoIP client 104 can send to the home subscription server 118 to invoke the subject VoIP application service.

The activation server 110 may send a message 234 to the billing server 112 and/or a billing and reconciliation server to arrange appropriate payment for the application server 114 providing the subject VoIP application service to the first VoIP phone 102. This message may be referred to as a verify account message. For example, the activation server 110 may access an application programming interface (API) of the billing server 112 to add periodic post-paid billing to a communication services account of a user of the first VoIP phone 102 for providing the VoIP application service to the first VoIP phone 102. Alternatively, the activation server 110 may access the API of the billing server 112 to establish a pre-paid mechanism for providing the VoIP application service for the first VoIP phone 102. For example, an account balance of a pre-paid account of a user of the first VoIP phone 102 may be decremented each time the VoIP application service is invoked while funds remain in the subject pre-paid account. Alternatively, the activation server 110 may access the API of the billing server 112 to arrange a one time invocation of the VoIP application service by the first VoIP phone 102. In this later alternative, the first VoIP phone 102 may need to activate the VoIP application service via the activation server 110 for every single invocation of the subject VoIP application service.

When appropriate payment arrangements have been completed, the billing server 112 may return a message 236 to the activation server 110. This may be referred to as a verify message. If the billing server 112 indicates that the payment arrangements were completed successfully, the activation server 110 sends a message 238, for example a session initiation protocol message, to the application server 114 conveying the identification of the subscribed VoIP application service and the trigger signal. This may be referred to as a subscribe information message. The message 238 may also comprise information about transmitting VoIP application service activation events to the billing server 112 to bill for providing the subject VoIP application service.

In response to receiving message 238, the application server 114 sends a message 240, for example a session initiation protocol message, to the home subscription server 118 identifying routing information that the home subscription server 118 is to use to route a VoIP application service invocation command to the application server 114 in the event the first VoIP phone 102 sends a message containing the trigger signal to the home subscription server 118. The message 240 may be referred to as a set up message. In an embodiment, the application server 114 may send information defining a traffic flow template that defines how the home subscription server 118 can route a trigger signal to the application server 114 based on filtering a session initiation protocol message from the first VoIP phone 102. It is understood that alternative VoIP application service subscription set-up and/or provisioning messaging sequences are also contemplated by the present disclosure.

Figure 4:
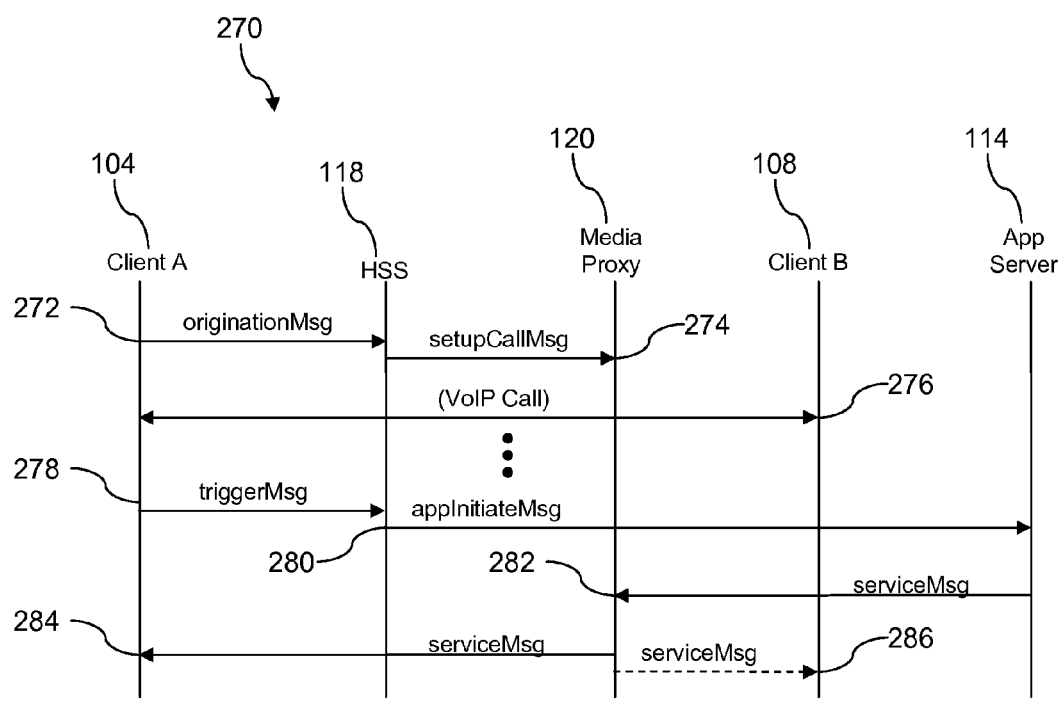
FIG. 4 is a message sequence diagram of a voice over internet protocol (VoIP) call that includes dynamic invocation of a voice over internet protocol application according to an embodiment of the disclosure.

Turning now to FIG. 4, a message sequence diagram 270 is described. When the first VoIP phone 102 sends a message 272, which may be referred to as an origination message, to initiate a VoIP call to the second VoIP phone 106, the home subscription server 118 may dynamically set up the media proxy 120 to bridge the VoIP streams passing between the two VoIP phones 102, 106. For example the home subscription server 118 may send a message 274 to a server that invokes an instance of the media proxy 120. The message 274 may be referred to as a set up call message. The VoIP call 276 is then established to be bridged through the media proxy 120. By arranging that the VoIP call 276 routes through the media proxy 120, the system 100 may dynamically deliver VoIP application service from the application server 114 to one or both of the first VoIP phone 102 and/or the second VoIP phone 106 via the media proxy 120 without any interruptions of the established VoIP call. If neither of the VoIP phones 102, 106 has subscribed to any VoIP application services, the home subscription server 118 may not arrange for the VoIP call to route through the media proxy 120, and the VoIP call may be completed in a peer-to-peer operation mode.

While the VoIP call is active, the first VoIP phone 102 may transmit the trigger signal to the home subscription server 118, for example the user of the first VoIP phone 102 may activate a special key code or select a soft key to invoke sending a session initiation protocol message containing the trigger signal to the home subscription server 118. For example, the first VoIP client 104 sends a message 278 to the home subscription server 118. The message 278 may be referred to as a trigger message. In one case, for example, the trigger signal may be transmitted by the first VoIP phone 102 in response to the user of the first VoIP phone 102 entering a "*9" key code. When the home subscription server 118 receives the message 278 containing the trigger signal, the home subscription server 118 sends a message 280 to the application server 114 commanding the activation server 114 to provide the subject VoIP application service to the first VoIP phone 102 via the media proxy 120. The message 280 may be referred to as an application initiate message.

Depending on the functionality provided by the subject VoIP application service, the application server 114 sends a message 282 and/or a data stream to media proxy 120. The message 282 may be referred to as a service message. In response to receiving the message 282, the media proxy 120 sends the message 284 to the first VoIP client 104. For example, the message 284 may comprise an audio transcription of an email directed to a user of the VoIP phone 102 that is flagged with a high importance value. The media proxy 120 may mix the audio message with a first VoIP stream received from the second VoIP phone 106 to create a second VoIP stream that the media proxy transmitted to the first VoIP phone 102. The first VoIP phone 102 may present the second VoIP stream, and the user of the first VoIP phone 102 may hear the voice message being spoken by the user of the second VoIP phone 106 with the audio transcription of the email superimposed over the voice message. Depending on the functionality provided by the subject VoIP application service, the media proxy 120 may send a message 286 based on the message 282 to the second VoIP client 108. Both the message 284 and the message 286 may be referred to, likewise, as service messages.

A variety of VoIP application services are contemplated by the present disclosure. It is understood that the system 100 and associated methods may suitably be employed to subscribe to, to provision, to invoke, and to deliver these VoIP application services and other VoIP application services to VoIP phones 102, 106, and the POTS phone 160. A concierge application may provide a variety of assistances to the user of the first VoIP phone 102 and optionally to the user of the second VoIP phone 106 or the POTS phone 160. For example, the concierge application may monitor the VoIP stream transmitted by the first VoIP phone 102 to detect a concierge activation word string, for example "concierge on." When the concierge application detects the activation word string, the concierge application monitors the VoIP stream transmitted by the first VoIP phone 102 to determine a context of the VoIP call and provide useful information pursuant to the context. For example, if the context of the VoIP call is a discussion of plans to go see a movie, the concierge application may identify a movie schedule of one or two movies that correlate with a preference profile of the user of the first VoIP phone 102 known to the concierge application and transmit a voice message about the movie schedules to the first VoIP client 104 and optionally to the second VoIP client 108. To enable the concierge application, the media proxy 120 may send the VoIP stream generated by the first VoIP phone 102—represented as stream a in FIG. 1—and the VoIP stream generated by the second VoIP phone 106—represented as stream b in FIG. 1—to the application server 114.

Turning again to FIG. 1, in an embodiment, the application server 114 may transmit VoIP stream e, VoIP stream f, and VoIP stream g to the media proxy 120. The media proxy 120 understands that VoIP stream e is to be mixed only with the VoIP stream b originated by the second VoIP client 108 and transmitted to the first VoIP client 104, which may be referred to as one-way insertion. The media proxy 120 understands that the VoIP stream f is to be mixed only with the VoIP stream a originated by the first VoIP client 104 and transmitted to the second VoIP client 108, which likewise may be referred to as one-way insertion. The media proxy 120 understands that the VoIP stream g is to be mixed both with the VoIP stream b originated by the second VoIP client 108 and transmitted to the first VoIP client 104 and to be mixed with the VoIP stream a originated by the first VoIP client 104 and transmitted to the second VoIP client 108, which may be referred to as two-way insertion.

The mixing of the multiple VoIP streams, for example the VoIP e stream originated by the application server 114 with the VoIP b stream originated by the second VoIP client 108, may be accomplished by any process known to those of skill in the art. In an embodiment, the VoIP e stream may be transformed into a first analog signal, the VoIP b stream may be transformed into a second analog signal, the first and second analog signals may be superimposed to produce a third analog signal, possibly after applying an appropriate weighting and/or amplification to the first and second analog signals, and the third analog signal may be digitized to form the VoIP stream delivered to the first VoIP client 104. Alternatively, the VoIP e stream and the VoIP b stream may be combined in the digital domain, for example by adding bytes encoding time sampled amplitudes of audio signals. As is known to those of skill in the art, a process referred to as companding is sometimes used in digitizing voice for communication transmission, and any companding processes applied in generating the VoIP streams may be taken into account during combining and/or mixing the VoIP streams. For more details about the concierge service, see U.S. patent application Ser. No. 12/698,513 filed Feb. 2, 2010, entitled "Concierge for Portable Electronic Device" by Jeremy R. Breau et al., which was incorporated by reference above.

A memo VoIP application service may be provided using the system 100. For example, the first VoIP phone 102 may activate the memo VoIP application service by entering a key code and then speak commands into the first VoIP phone 102 that are transmitted to the media proxy 120 and thence to the application server 114 on the VoIP stream a. The memo VoIP application service may respond to commands to record a spoken memo, translate the memo to text, store the text memo, and remind the user of the first VoIP phone 102 at a time commanded by the user by sending an email, sending a text message, or by another mechanism. It is possible that the memo VoIP application service may be invoked by the first VoIP phone 102 even when the first VoIP phone 102 is not engaged in an on-going VoIP call.

A sound board VoIP application service may be provided using the system 100. A plurality of audio snippets and/or sound bites may be stored and played back by the application server 114 on command by the first VoIP phone 102. For example, on the event that the user of the second VoIP phone 106 says something involving a long and/or convoluted supporting argument, the user of the first VoIP phone 102 may invoke the playing of an audio snippet reciting "that's just jibber-jabber!" in a deep, gruff voice. As another example, if the user of the second VoIP phone 106 is describing a promising new job opportunity, the first VoIP phone 106 may invoke the playing of an audio snippet of a stereotypical cash register "cha-Ching!" The selected audio snippet could be transmitted by the application server 114 to the media proxy 120 to be inserted into the VoIP stream transmitted by the media proxy to the first VoIP phone 102 and to the VoIP stream transmitted by the media proxy 120 to the second VoIP phone in two-way insertion. Alternatively, the selected audio snippet could be inserted into the VoIP stream transmitted by the media proxy 120 to only the second VoIP phone 106 in one-way insertion. It is contemplated that a virtually endless list of audio snippets could be configured for use with such a sound board VoIP application, the only real limitations of which may be how many different key codes the user of the first VoIP phone 102 can remember. Alternatively, a sound board client application may be installed on the first VoIP phone 102 that provides a voice based interface that the user of the first VoIP phone 102 may use to speak aural cues for invoking different audio snippets.

A background music VoIP application service may be provided using the system 100. A plurality of audios may be stored and played back by the application server 114 on command by the first VoIP phone 102 as a background for a VoIP call between the first VoIP phone 102 and the second VoIP phone 106. The user of the first VoIP phone 102 may select a soothing and/or romantic themed audio to play as a background of a VoIP call to a girlfriend of boyfriend. The user of the first VoIP phone 102 may select a piece of classical music conveying gravitas to play as a background of a VoIP call to his boss to report from the field. The background music could be transmitted by the application server 114 to the media proxy 120 to be inserted into the VoIP stream transmitted by the media proxy 120 to the first VoIP phone 102 and to the VoIP stream transmitted by the media proxy 120 to the second VoIP phone in two-way insertion. Alternatively, the background music could be inserted into the VoIP stream transmitted by the media proxy 120 to only the first VoIP phone 102 or to the second VoIP phone 106 in one-way insertion.

A number of other VoIP application services are contemplated. The system 100 is thought to be suitable for provisioning and delivering any of these VoIP application services. It is contemplated that the provisioning and VoIP application service delivery framework of the system 100 may encourage the growth of a large number of VoIP applications developed by independent third party developers.

Figure 5:
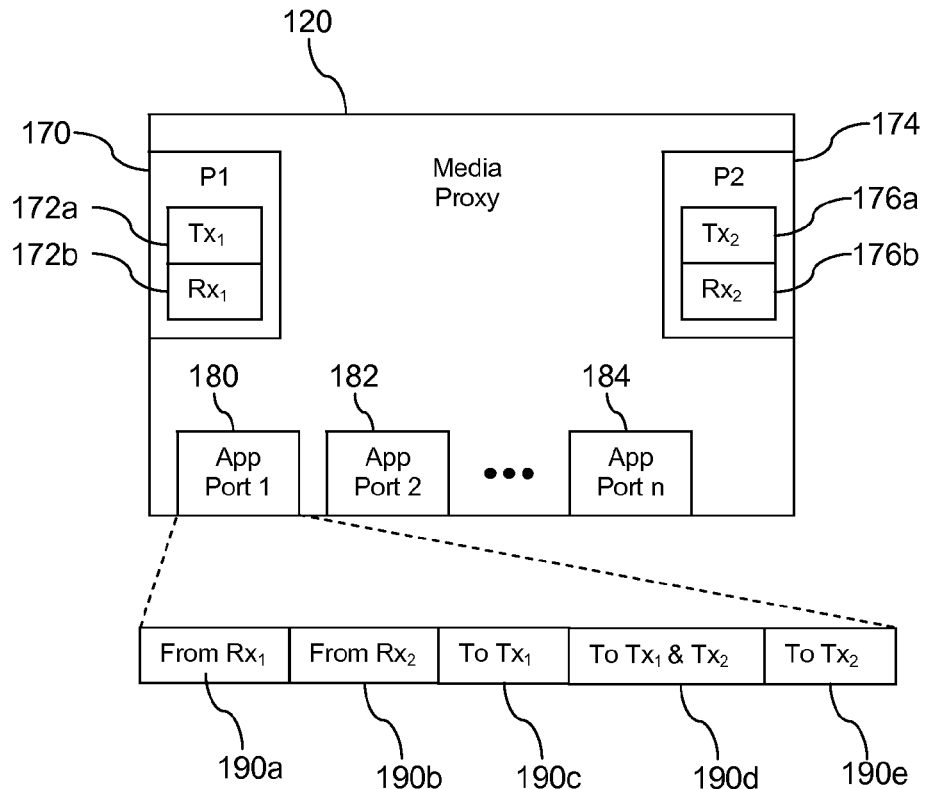
FIG. 5 is a block diagram of a media proxy according to an embodiment of the disclosure.

Turning now to FIG. 5, a port map of the media proxy 120 is described. When the home subscriber server 118 sets up the media proxy 120, for example when the home subscriber server 118 commands a server to initiate an instance of the media proxy 120, the media proxy 120 may be configured to provide transmit and receive ports to each of the first VoIP phone 102 and the second VoIP phone 106. For example, a first VoIP port 170 may comprise a first transmit VoIP port 172*a* to transmit a VoIP stream, for example any of VoIP stream b+e+g to the first VoIP phone 102 and a first receive VoIP port 172*b* to receive a VoIP stream, for example VoIP stream a, from the first VoIP phone 102. A second VoIP port 174 may comprise a second transmit VoIP port 176*a* to transmit a VoIP stream, for example any of VoIP stream a+f+g to the second VoIP phone 106 and a second receive VoIP port 176*b* to receive a VoIP stream, for example VoIP stream b, from the second VoIP phone 106.

The media proxy 120 may be configured to provide a plurality of application ports, which may be referred to in some contexts as auxiliary ports, for example a first application port 180, a second application port 182, and a third application port 184. While three application ports 180, 182, 184 are illustrated in FIG. 5, it is understood that fewer or more application ports may be provided. Each of the application ports 180, 182, 184 may comprise a plurality of application receive VoIP ports and application transmit VoIP ports. For example, the first application port 180 may comprise a first application receive VoIP port 190*a* to receive the VoIP a stream originated by the first VoIP phone 102 and a second application receive VoIP port 190*b* to receive the VoIP b stream originated by the second VoIP phone 106. The first application port 180 may further comprise a first application transmit VoIP port 190*c* to transmit the VoIP e stream for one-way insertion into the VoIP b stream originated by the second VoIP phone 106, a second application transmit VoIP port 190*d* to transmit the VoIP g stream for two-way insertion into the VoIP a stream originated by the first VoIP phone 102 and the VoIP b stream originated by the second VoIP phone 106, and a third application transmit VoIP port 190*e* to transmit the VoIP f stream for one-way insertion into the VoIP a stream originated by the first VoIP phone 102.

The plurality of application ports 180, 182, 184 may be initiated but maintained in a dormant state by the media proxy 120 until a VoIP application 116 connects to the application port 180, 182, 184. In some contexts, an application port 180, 182, 184 in a dormant state may be said to be in a daemonized state. The application ports 180, 182, 184 promote the dynamic activation and delivery of a variety of VoIP application services through the media proxy 120. The addresses of the application ports 180, 182, 184 can be inferred from the address of the first VoIP port 170 and/or the address of the second VoIP port 174. Thus, a VoIP application 116 wishing to dynamically connect to an application port 180, 182, 184 need only know the address of one of the first VoIP port 170 and the address of the second VoIP port 174 to determine the addresses of the application ports 180, 182, 184 and select one of these ports to attach to.

Figure 6:
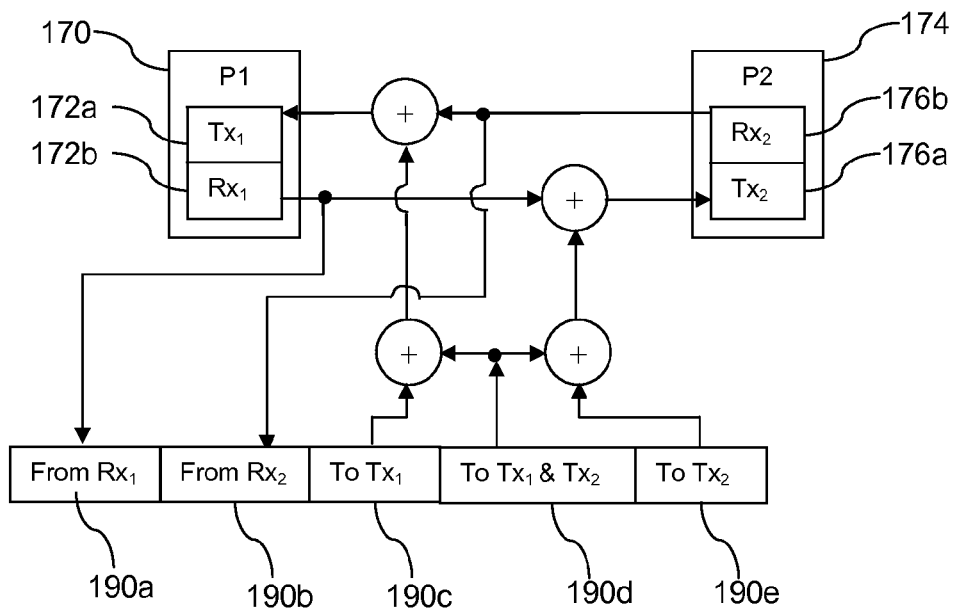
FIG. 6 is a block diagram of a mixing function of a media proxy according to an embodiment of the disclosure.

Turning now to FIG. 6, an embodiment of a mapping among the VoIP ports 170, 174, and the application port 180 including mixing operations is described. The mapping among the VoIP ports 170, 174 and the remaining application ports 182, 184 may be substantially similar to that illustrated in FIG. 6. The VoIP stream received at first VoIP receive port 172b, for example VoIP a stream, is transmitted to the first application VoIP receive port 190a. Additionally, the VoIP stream received at the first VoIP receive port 172b is mixed with any VoIP stream received from either of the second application VoIP transmit port 190d, for example VoIP f stream, and the third VoIP transmit port 190e, for example VoIP g stream. As illustrated in FIG. 6, the VoIP stream received from the second application VoIP transmit port 190d and the VoIP stream received from the third VoIP transmit port 190e are mixed together and this mixed VoIP stream is mixed with the VoIP stream received at the first VoIP receive port 172b, but in another embodiment the mixing may be performed in a single step. The combined VoIP streams—VoIP a stream, VoIP f stream, and VoIP g stream—are transmitted to the second transmit VoIP port 176a for transmitting to the second VoIP phone 106.

The VoIP stream received at second VoIP receive port 176b, for example VoIP stream b, is transmitted to the second application VoIP receive port 190b. Additionally, the VoIP stream received at the second VoIP receive port 176b is mixed with any VoIP stream received from either of the first application VoIP transmit port 190c, for example VoIP e stream, and the second VoIP transmit port 190d, for example VoIP g stream. As illustrated in FIG. 6, the VoIP stream received from the first application VoIP transmit port 190c and the VoIP stream received from the second application VoIP transmit port 190d are mixed together and this mixed VoIP stream is mixed with the VoIP stream received at the second VoIP receive port 176b, but in another embodiment the mixing may be performed in a single step. The combined VoIP streams—VoIP b stream, VoIP e stream, and VoIP g stream—are transmitted to the first transmit VoIP port 172a for transmitting to the first VoIP phone 102. As discussed further above, the mixing and/or combining of the various VoIP streams may be accomplished by any of a variety of methods known to those of ordinary skill in the art.

Figure 7:
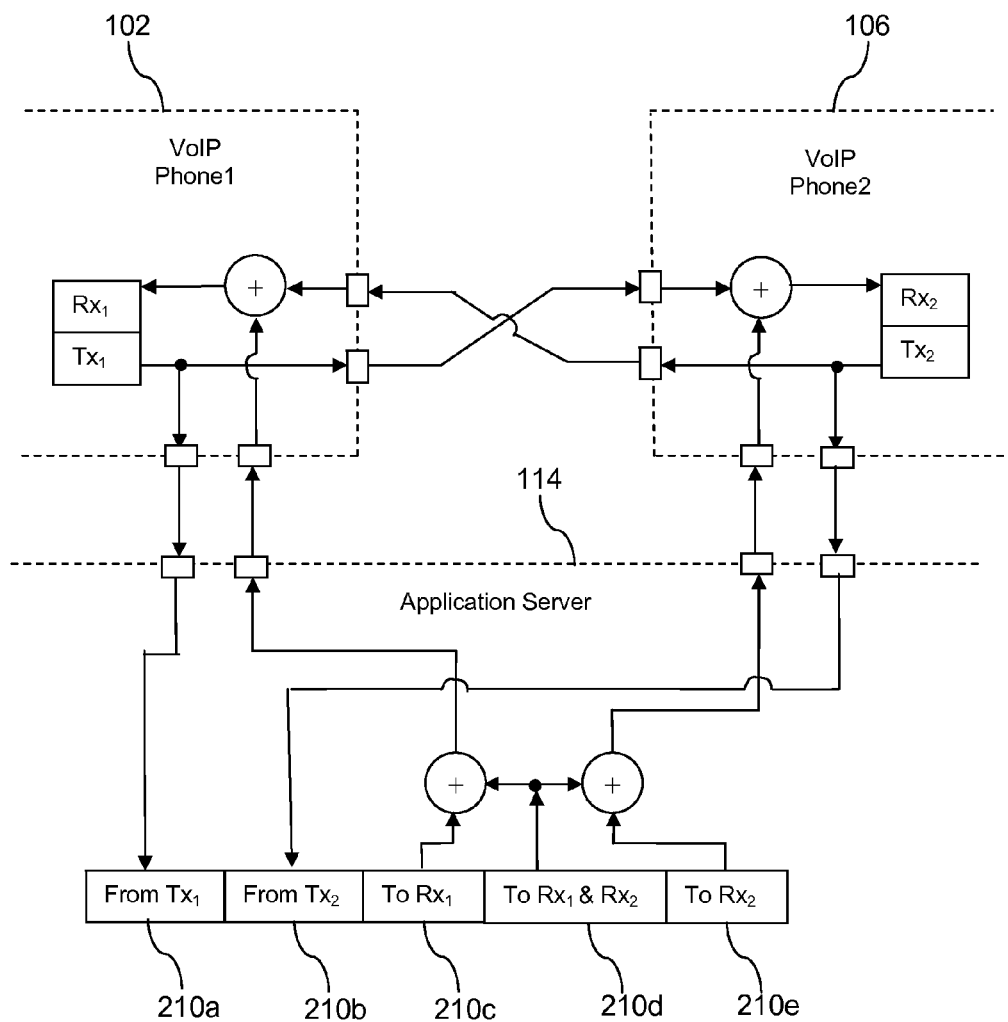
FIG. 7 is a block diagram of mixing functions distributed to communication nodes according to an embodiment of the disclosure.

Turning now to FIG. 7, an alternative implementation of the mixing and/or combining functions described above with reference to the media proxy 120 is described. In the embodiment, of FIG. 7, the mixing functions are performed within one or more of the first VoIP phone 102, the second VoIP phone 106, and the application server 114. The inputs and outputs of the application server 114, in an embodiment, may be composed based on From $Tx_1$ signal 210a, From $Tx_2$ signal 210b, To $Rx_1$ signal 210c, To $Rx_1$ and $Rx_2$ signal 210d, and To $Rx_2$ signal 210e. The transmission of VoIP streams between the VoIP phones 102, 106 is from a transmit port of one VoIP phone to a corresponding receive port of the other VoIP phone. When the application server 114 provides a VoIP stream for either one-way insertion or two-way insertion, the application server 114 generates a suitable VoIP stream and sends to one of the VoIP phones for one-way insertion or to both phones for two-way insertion. Each of the VoIP phones 102, 106 mix any insertion VoIP stream from the application server 114 into the VoIP stream received from the other VoIP phone. One of ordinary skill in the art will appreciate that other alternative configurations of mixing operations conform with the teachings of the present disclosure. For example, the first VoIP phone 102 could be designed to perform all mixing functions, essentially absorb into itself the mixing functions described in detail with reference to FIG. 6. Alternatively, the application server 114 may only support one-way insertion, the first VoIP phone 102 may provide the mixing function illustrated in FIG. 7, the application server 114 can have a single transmit port for providing one-way insertion VoIP stream to the first VoIP phone 102, while the second VoIP phone 106 provides no mixing function. When the application server 114 only supports one-way insertion, the first VoIP phone 102 may mix the input from the application server 114, for example the To $Rx_1$ signal 210c, with the $Tx_1$ signal that it transmits to the second VoIP phone 106. In this case, the first VoIP phone 102 would effectively integrate some or all of the role of the media proxy 120 described above. In an embodiment, the first VoIP phone 102 may selectively mix the input from the application server 114, for example the To $Rx_1$ signal 210c, with the $Tx_1$ signal that it transmits to the second VoIP phone 106, for example based on a user input to the first VoIP phone 102. All of these alternative configurations for providing VoIP mixing functions are contemplated by the present disclosure.

Figure 8:
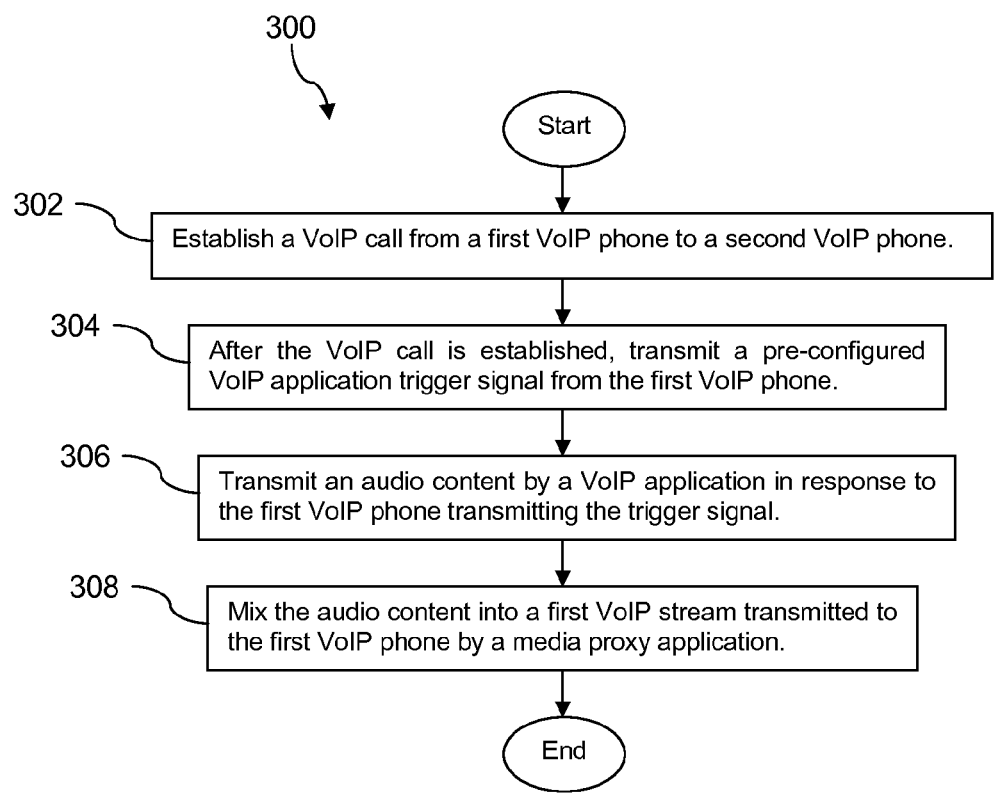
FIG. 8 is a flow chart of a method according to an embodiment of the disclosure.

Turning now to FIG. 8, a method 300 is described. At block 302, a VoIP call is established from the first VoIP phone 102 to the second VoIP phone 106 or to the POTS phone 160 via the media gateway 162. The home subscription server 118 may arrange for the VoIP call to be routed through the media proxy 120, for example an instance of the media proxy 120 executing on a server, as described more fully above. At block 304, after the VoIP call is established, the first VoIP phone 102 transmits a pre-configured VoIP application trigger signal. For example, a user of the first VoIP phone 102 activates a key code that has been pre-configured to send a session initiation protocol message comprising a trigger signal to the home subscription server 118, and the first VoIP client 104 and/or the first VoIP phone 102 transmits the subject session initiation protocol message containing the trigger signal to the home subscription server 118.

At block 306, the VoIP application 116 transmits an audio content in response to the first VoIP phone 102 transmitting the subject session initiation protocol message containing the trigger signal to the home subscription server 118. For example, in response to receiving the session initiation protocol message containing the trigger signal from the first VoIP phone 102, the home subscription server 118 transmits a session initiation protocol message to the application server 114 commanding the activation of the VoIP application service for the first VoIP client 104. When the VoIP application 116 is brought into service for use of the first VoIP client 104, for example when an instance of the VoIP application 116 associated with the first VoIP client 104 is instantiated, the VoIP application 116 transmits an audio message to the first VoIP client 104, for example one of the audio messages and/or audio snippets described above.

At block 308, the audio message and/or audio content is mixed into a first VoIP stream transmitted to the first VoIP phone 102 by the media proxy 120, for example the media proxy 120 mixes the VoIP e stream with the VoIP b stream transmitted to the media proxy 120 by the second VoIP phone 106 (or the POTS phone 160 via the media gateway 162) and transmits the mixed VoIP e and VoIP b streams to the first VoIP phone 102. Alternatively, the audio message may be mixed into a first VoIP stream transmitted to the first VoIP phone 102 and into a second VoIP stream transmitted to the second VoIP phone 106 (or the POTS phone 160 via the media gateway 162) by the media proxy 120.

Figure 9:
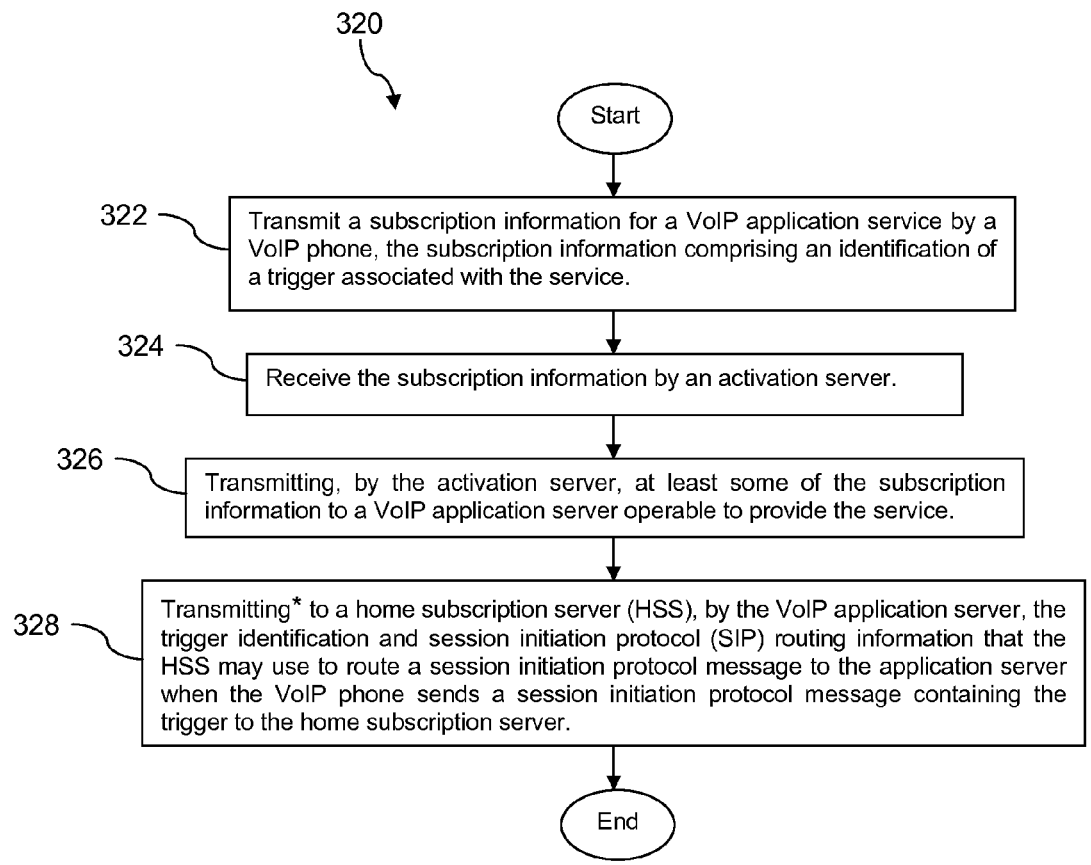
FIG. 9 is a flow chart of a method according to an embodiment of the disclosure.

Turning now to FIG. 9, a method 320 is described. At block 322, subscription information for a VoIP application service is transmitted by a VoIP phone, for example the first VoIP phone 102 to the activation server 110. The subscription information may comprise an identification of the subject VoIP application service and an identification of a trigger signal to be associated with the VoIP application service, for example a trigger signal to be used to trigger the home subscription server 118 to invoke the subject VoIP application service on behalf of the first VoIP phone 102. At block 324, the subscription information transmitted by the VoIP phone is received by the activation server 110.

At block 326, the activation server 110 transmits at least some of the subscription information to the VoIP application server 114. The VoIP application server 114 is understood to be configured to execute the VoIP application 116 that provides the VoIP application service that the VoIP phone has identified it wishes to subscribe to. Because the system 100 may support a plurality of VoIP application services executed by VoIP applications 116 installed on a plurality of different application servers 114, the activation server 110 may comprise a mapping between VoIP application services and the application servers 114 that support the corresponding VoIP applications 116. Alternatively, the activation server 110 may access a database that stores the mapping between VoIP application services and the application servers 114 that support the corresponding VoIP applications 116. In an embodiment, the activation server 110 may also transmit an identity of the VoIP phone that is subscribing to the subject VoIP application service to the application server 114. In an embodiment, the activation server 110 may also transmit billing information to the application server 114 that promotes the application server 114 sending billing information to the billing server 112 or other device so the user of the VoIP phone receiving the VoIP application service may be billed appropriately.

At block 328, the application server 114 transmits to the home subscription server 118 the trigger identification and session initiation protocol routing information that the home subscriber server 118 may use to route a session initiation protocol message to the application server 114 when the VoIP phone sends a session initiation protocol message containing the trigger signal to the home subscription server 118 invoking the subject VoIP application service. The application server 114 may transmit additional information to the home subscription server 118 such as one or more traffic flow templates. A traffic flow template may define where, who, and by what method to send a session initiation protocol packet as well as other options for sending the session initiation protocol message based on the contents of the session initiation protocol packet, for example based on fields in a header of the session initiation protocol packet.

The method 320 may be referred to as a method for subscribing to and/or provisioning a VoIP application service. It is contemplated that the method 320 may be employed to provision and/or to activate a subscription to a wide variety of VoIP application services. It is contemplated that in the near future a wide variety of VoIP application services may be developed by independent, third party developers, as deployment of the IMS network continues and as VoIP communication becomes more common. It is hoped that the robust, generally applicable subscription and/or provisioning method provided by method 320 will play a role encouraging the adoption of the VoIP application service paradigm by the public.

Figure 10:
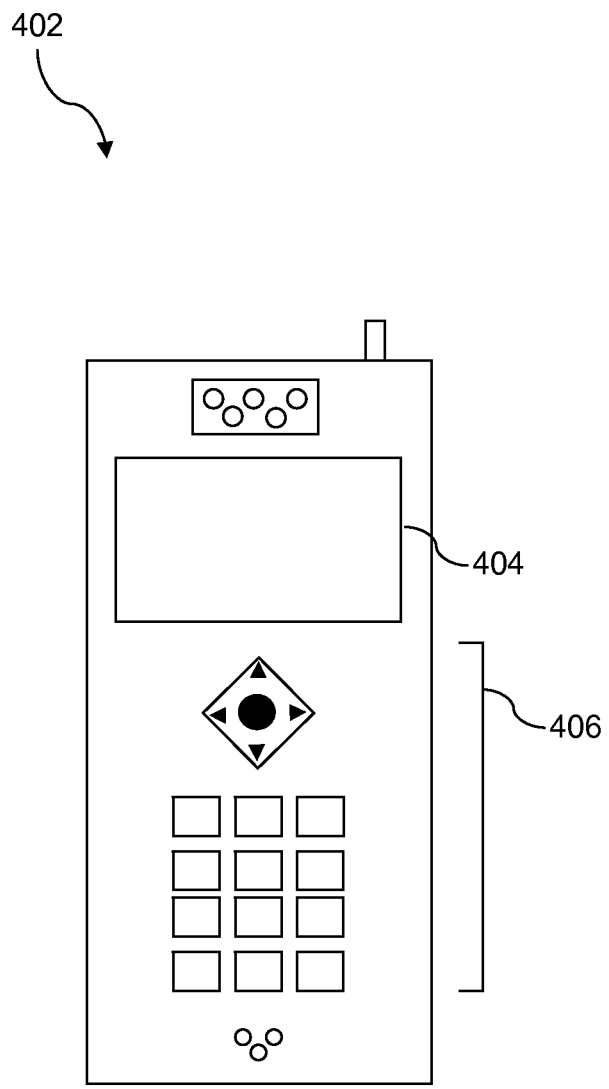
FIG. 10 is an illustration of a handset according to an embodiment of the disclosure.

Turning now to FIG. 10, a handset 402 is described. The handset 402 may be used to embody the one or more of the VoIP phones 102, 106, but the VoIP phones 102, 106 may be embodied in other forms than that illustrated in FIG. 10. Though illustrated as a mobile phone, the handset 402 may take various other forms including a portable electronic device, a wireless handset, a pager, a personal digital assistant (PDA), a gaming device, an inventory control device, a media player, a digital camera, a digital calculator, a portable computer, a tablet computer, a laptop computer, and/or other. In some embodiments of the present disclosure, the handset 402 may support specialized activities such as gaming, inventory control, job control, and/or task management functions, and so on.

The handset 402 includes a display 404 and a touch-sensitive surface and/or keys 406 for input by a user. The handset 402 may present options for the user to select, controls for the user to actuate, and/or cursors or other indicators for the user to direct. The handset 402 may further accept data entry from the user, including numbers to dial or various parameter values for configuring the operation of the handset. The handset 402 may further execute one or more software or firmware applications in response to user commands. These applications may configure the handset 402 to perform various customized functions in response to user interaction. Additionally, the handset 402 may be programmed and/or configured over-the-air, for example from a wireless base station, a wireless access point, or a peer handset 402. The handset 402 may execute a web browser application which enables the display 404 to show a web page. The handset 402 may execute the VoIP client 104 to subscribe to, invoke, and receive a VoIP application service.

Figure 11:
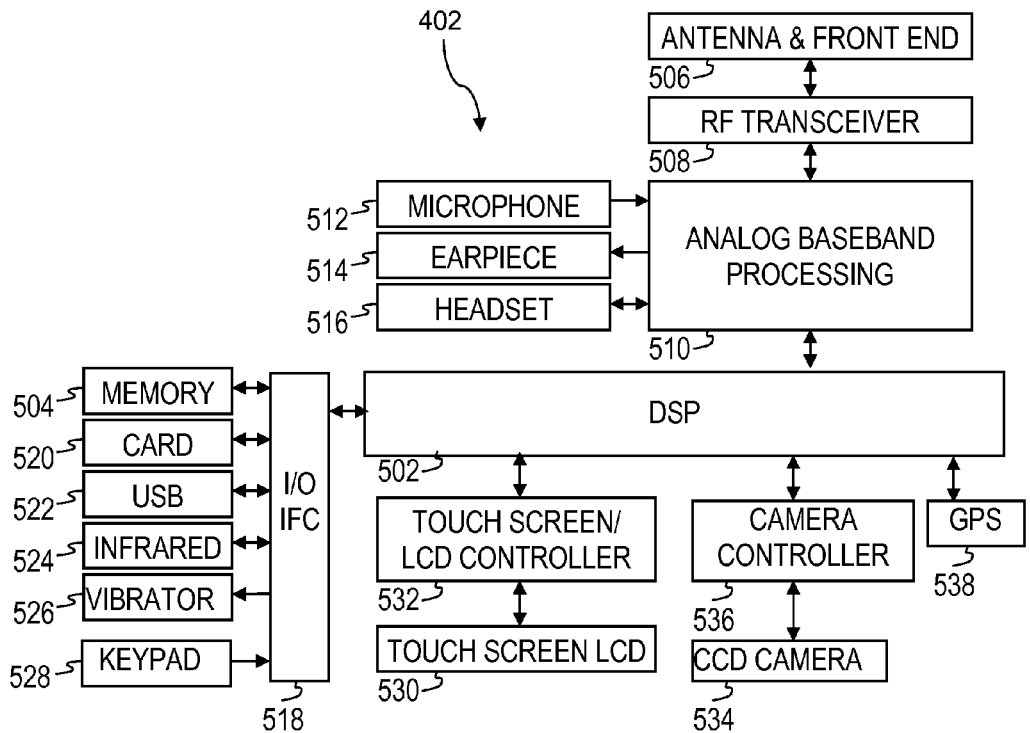
FIG. 11 is a block diagram of a handset according to an embodiment of the disclosure.

Turning now to FIG. 11, a block diagram of the handset 402 is described. While a variety of known components of handsets 402 are depicted, in an embodiment a subset of the listed components and/or additional components not listed may be included in the handset 402. The handset 402 includes a digital signal processor (DSP) 502 and a memory 504. As shown, the handset 402 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 402 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 402 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 402 to send and receive information from a radio access network (RAN) or some other available wireless communications network or from a peer handset 402. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 402 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 402 to function as a peripheral device to exchange information with a personal computer or other computer system. The infrared port 524 and other optional ports such as a Bluetooth interface or an IEEE 802.11 compliant wireless interface may enable the handset 402 to communicate wirelessly with other nearby handsets and/or wireless base stations.

The input/output interface 518 may further connect the DSP 502 to the vibrator 526 that, when triggered, causes the handset 402 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 402. Another input mechanism may be the touch screen LCD 530, which may also display text and/or graphics to the user. The touch screen LCD controller 532 couples the DSP 502 to the touch screen LCD 530.

The CCD camera 534 enables the handset 402 to take digital pictures. The DSP 502 communicates with the CCD camera 534 via the camera controller 536. The GPS sensor 538 is coupled to the DSP 502 to decode global positioning system signals, thereby enabling the handset 402 to determine its position. In another embodiment, a camera operating according to a technology other than charge coupled device cameras may be employed. Various other peripherals may also be included to provide additional functions, e.g., radio and television reception.

Figure 12:
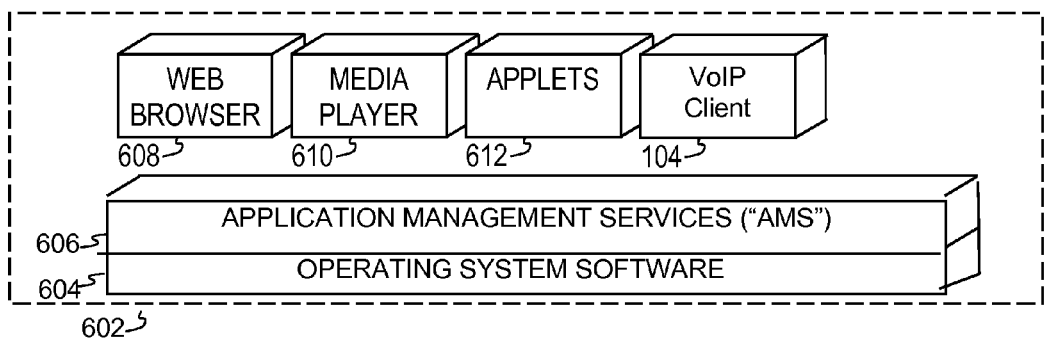
FIG. 12 is a block diagram of a software architecture of a handset according to an embodiment of the disclosure.

Turning now to FIG. 12, a software environment 602 that may be implemented by the DSP 502 is described. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the handset 402. Also shown in FIG. 6 are a web browser application 608, a media player application 610, JAVA applets 612, and the VoIP client 104. The web browser application 608 configures the handset 402 to operate as a web browser, allowing a user to enter information into forms and select links to retrieve and view web pages. The media player application 610 configures the handset 402 to retrieve and play audio or audiovisual media. The JAVA applets 612 configure the handset 402 to provide games, utilities, and other functionality. The VoIP client 104 has already been discussed above. The VoIP client 104 generally may provide an interface and underlying functionality for subscribing to, invoking, and receiving a VoIP application service.

Figure 13:
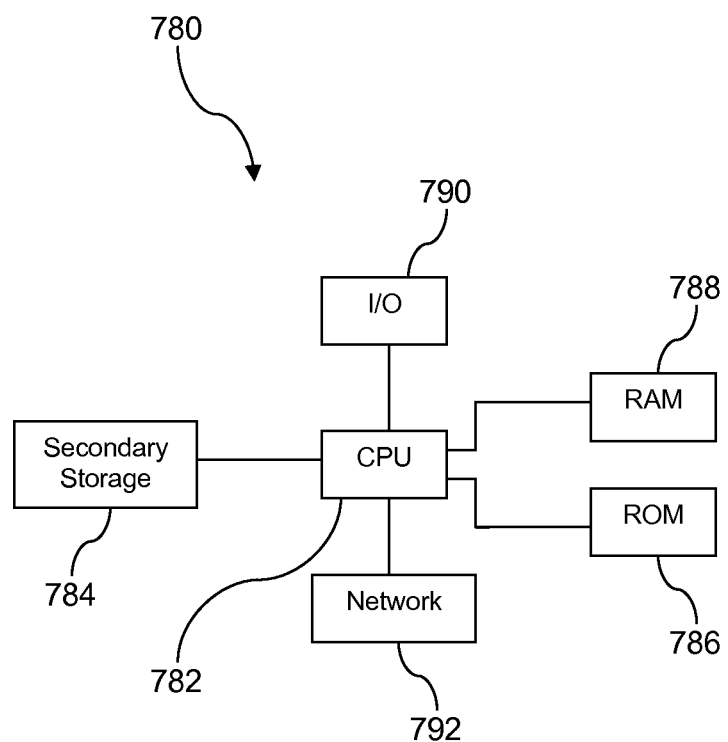
FIG. 13 illustrates an exemplary computer system suitable for implementing some aspects of the several embodiments of the disclosure.

Turning now to FIG. 13, a computer system 780 suitable for implementing one or more embodiments disclosed herein is described. For example, a computer system similar to the computer system 780 may suitably be employed to implement one or more of the activation server 110, the billing server 112, the application server 114, the home subscription server 118, and the content server 142. In an embodiment, a computer system similar to the computer system 780 may suitably be employed to implement a server on which the media proxy 120 executes. Additionally, some embodiments of the VoIP phones 102, 106 may be suitably implemented as a computer system similar to the computer system 780. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips. A wide variety of known semiconductor devices may be employed to implement the processor 782, including but not limited to microprocessors, digital signal processors (DSPs), application specific integrated circuits (ASICs), complex programmable logic devices (CPLDs), microcontrollers, and others semiconductor devices.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing voice over internet protocol applications, comprising:
   receiving, by an activation server, a subscription message transmitted by a first portable electronic device, wherein the subscription message identifies a selected voice over internet protocol application service and a trigger signal that the first portable electronic device will send to invoke the selected voice over internet protocol application service;
   transmitting, by the activation server, a subscribe information message to a voice over internet protocol application server, wherein the subscribe information message contains information identifying the first portable electronic device, information identifying the trigger signal, and information identifying the selected voice over internet protocol application service;
   transmitting, by the voice over internet protocol application server, a set up message to a home subscription server (HSS), wherein the set up message contains the information identifying the trigger signal and session initiation protocol routing information;
   establishing, by a media proxy application, a voice over internet protocol call from the first portable electronic device to a second portable electronic device, wherein establishing the voice over internet protocol call from the first portable electronic device to the second portable electronic device comprises:
      opening, by the media proxy application, a first receive port and a first transmit port coupling the first portable electronic device to the media proxy application;
      opening, by the media proxy application, a second receive port and a second transmit port coupling the second portable electronic device to the media proxy application; and
      reserving, by the media proxy application, at least one set of voice over internet protocol application ports at a predefined offset from the first transmit port, the second transmit port, the first receive port, and the second receive port;
   receiving, by the voice over internet protocol application server, the trigger signal transmitted by the home subscription server;
   providing, by the voice over internet protocol application server to the media proxy application, the selected voice over internet protocol application service, wherein the selected voice over internet protocol application service comprises a digital media stream of audio content that is configured to be mixed with a voice over internet protocol stream; and
   mixing, by the media proxy application, the audio content with the voice over internet protocol stream to produce a mixed voice over internet protocol stream, wherein the mixed voice over internet protocol stream is transmitted to the first portable electronic device.

2. The method of claim 1, further comprising verifying payment by the activation server.

3. The method of claim 2, wherein verifying payment comprises the activation server communicating with a billing server.

4. The method of claim 2, wherein the voice over internet protocol application server provides the selected voice over internet protocol service as one of a pre-paid service and a post-paid service.

5. The method of claim 2, wherein the voice over internet protocol application server provides the selected voice over internet protocol service as a single use service.

6. The method of claim 1, wherein receiving the trigger signal comprises receiving from the first portable electronic device audio content comprising speech and analyzing the speech to identify at least one command.

7. The method of claim 1, wherein the selected voice over internet protocol application service is provided by the voice over internet protocol application server via the media proxy application.

8. The method of claim 1, wherein the media proxy application is stored in a memory in the voice over internet protocol application server, and wherein the voice over internet protocol stream is transmitted from the first portable electronic device to another the second portable electronic device.

9. The method of claim 1, wherein the media proxy application is stored in a memory in the first portable electronic device, and wherein the mixed voice over internet protocol stream is transmitted from the first portable electronic device to the second portable electronic device.

10. The method of claim 1, further comprising:
receiving, by the media proxy application, a second digital media stream from the voice over internet protocol application server;
receiving, by the media proxy application, a second voice over internet protocol stream from the second portable electronic device;
mixing, by the media proxy, the second voice over internet protocol stream with the second digital media stream to produce a second mixed voice over internet protocol stream; and
transmitting, by the media proxy, the second mixed voice over internet protocol stream.

11. The method of claim 1, wherein the digital media stream is a real time protocol (RTP) stream.

12. The method of claim 10, wherein the voice over internet protocol stream, the second voice over internet protocol stream, the mixed voice over internet protocol stream, and the second mixed voice over internet protocol stream are real time protocol (RTP) streams.

13. The method of claim 1, wherein the voice over internet protocol application server transmits the digital media stream based at least in part on digital media received from at least one of a calendar application, a real simple syndication (RSS) feed, a content server, and a subscription news service.

14. The method of claim 1, wherein the media proxy application executes on at least one of a server in a call path between the first portable electronic device and the second portable electronic device, the voice over internet protocol application server, and the first portable electronic device.

15. The method of claim 1, further comprising mixing, by the media proxy application, the audio content with a second voice over internet protocol stream to produce a second mixed voice over internet protocol stream, wherein the second mixed voice over internet protocol stream is transmitted to the second portable electronic device.

16. The method of claim 1, wherein the voice over internet protocol application server transmits the audio content to the media proxy application over one port of the at least one set of reserved voice over internet protocol application ports.

17. The method of claim 1, wherein the home subscription server uses the session initiation protocol routing information to transmit the application initiation message to the voice over internet protocol application server.

\* \* \* \* \*